Oct. 15, 1968

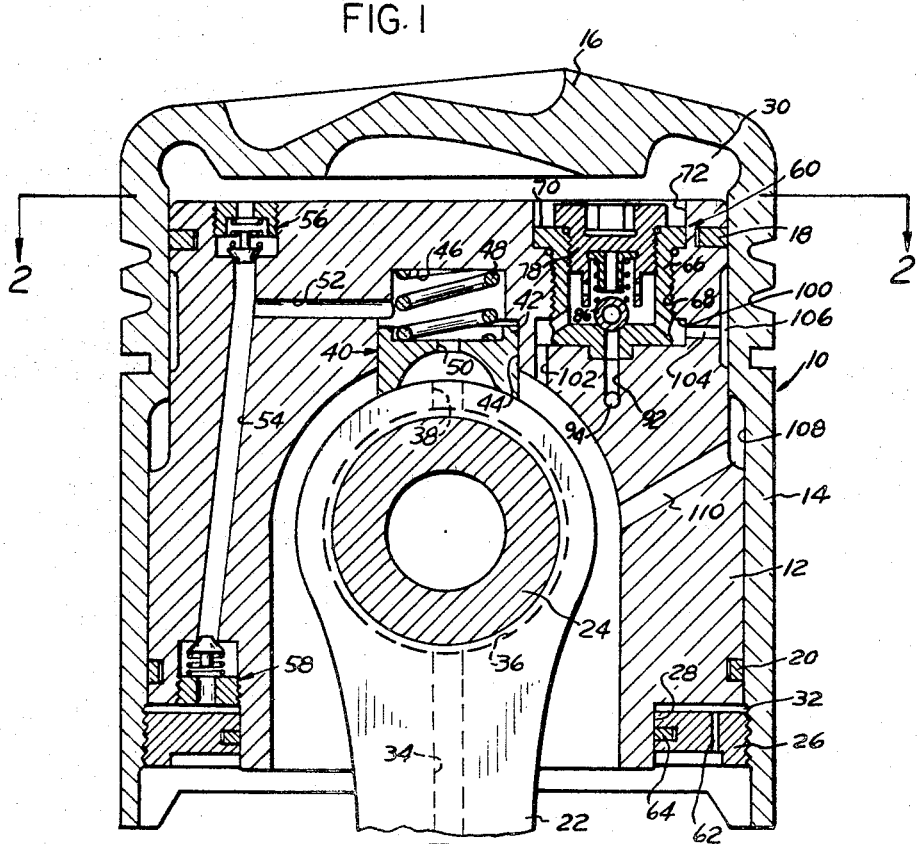

W. C. MARCHAND 3,405,697

HOLLOW VALVE CONSTRUCTION FOR VARIABLE
COMPRESSION RATIO PISTON

Filed Dec. 8, 1967

INVENTOR
WILLIAM C. MARCHAND

BY Hoske, Kraus, Kifford, i Patalidis

ATTORNEYS

United States Patent Office 3,405,697
Patented Oct. 15, 1968

3,405,697
HOLLOW VALVE CONSTRUCTION FOR VARIABLE COMPRESSION RATIO PISTON
William C. Marchand, Detroit, Mich., assignor to Continental Aviation and Engineering Corporation, Detroit, Mich., a corporation of Virginia
Filed Dec. 8, 1967, Ser. No. 689,196
7 Claims. (Cl. 123—78)

ABSTRACT OF THE DISCLOSURE

A two-part variable compression ratio piston assembly having an outer part movable relative to an inner part to vary the compression ratio of an internal combustion engine and a hydraulic system utilizing oil from the lubrication system of the engine for automatically controlling relative movement of the parts to maintain a predetermined maximum combustion chamber pressure. A hydraulic circuit includes an upper and a lower chamber which expands and contracts conversely upon relative movement of the piston parts and a system for supplying and discharging the oil to and from these chambers in a manner which gradually increases the compression ratio of the engine until a predetermined maximum combustion chamber pressure has been achieved and which tends to maintain the maximum combustion chamber pressure after it has been achieved. The hydraulic circuit includes a pressure responsive relief valve preset to discharge oil from the upper chamber to the crankcase of the engine upon a predetermined pressure increase being produced in that chamber and a hollow spherical construction for the valve member of the discharge valve assembly.

Background of the invention

The present invention relates to variable compression ratio (VCR) piston assemblies such as those disclosed in prior U.S. Patents Nos. 3,156,162, 3,161,112, 3,185,137, 3,185,138, 3,303,831 and 3,311,096. In the disclosures of these patents an inner piston member or carrier is connected in the usual manner to a connecting rod and an outer piston member or shell is carried by and is movable axially relative to the inner member. Relative movement of these members varies the compression ratio of the particular cylinder in which the piston moves. Clearance spaces are provided between the top and bottom ends of the inner and outer members and these form upper and lower chambers which vary conversely in volume in relation to the relative movement of the members. An incompressible fluid such as lubrication oil is supplied to these chambers in a manner which automatically regulates movement of the members to gradually increase the compression ratio until a predetermined combustion pressure has been achieved. The hydraulic system then varies the movement of the members in a manner which tends to maintain a uniform maximum combustion chamber pressure. In the type of assembly disclosed in these patents inertia is depended upon to provide the force for relative movement between the members and the hydraulic system is utilized to regulate the relative movement in response to changes in the fluid pressures. Inertia forces increase proportional to the square of engine speed and thus at high speeds operation of the pressure relief valve may be affected due to inertial effects on the valve parts so that it will take a greater pressure to open the valves of conventional construction at high engine speeds than it will at lower engine speeds. For this reason a number of previous attempts have been made to provide such valves designed to minimize the effects of inertia upon their proper operation.

Summary of the invention

The present invention provides a new construction for pressure relief discharge valve assemblies which includes a hollow spherical valve member having a specific density substantially that of the lubrication oil within the hydraulic circuit. In this way the effects of inertia on the valve member are substantially diminished and this in combination with a circuit which directs the oil from the upper chamber to beneath the hollow valve member so that opening movement is towards the upper chamber at a time when the inertial forces are also urging the valve member in that direction insures that the valve will not be delayed in opening to thereby produce an excess combustion chamber pressure at high engine speeds.

Description of the drawings

A preferred embodiment of the present invention is described more fully in the following description which refers to the accompanying drawings and in which like reference characters refer to like parts throughout the several views and in which:

FIG. 1 is a longitudinal cross-sectional view of a piston assembly embodying one preferred construction of the present invention, FIG. 2 is a fragmentary elevational view showing the upper surface of the inner piston part of FIG. 1.

Description of several preferred embodiments

Figure 3:
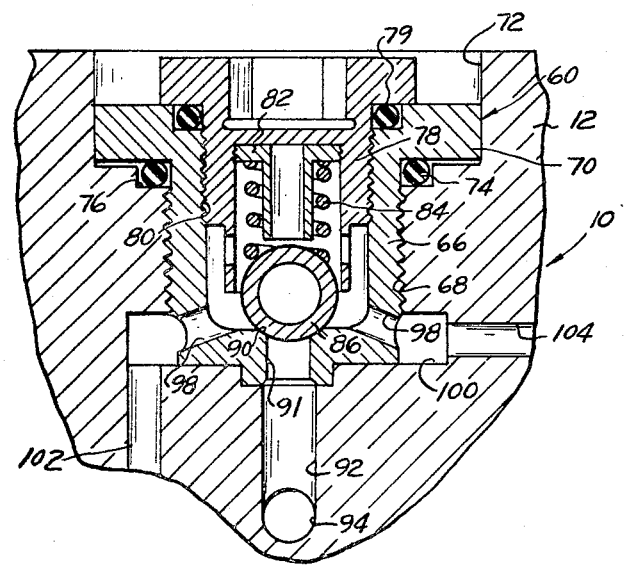
FIG. 3 is an enlarged fragmentary cross-sectional view of a portion of the structure illustrated in FIG. 1.

Now referring to the drawings for a more detailed description of the present invention, a preferred variable compression ratio (VCR) piston 10 is illustrated in FIGS. 1–3 as comprising an inner member or piston pin carrier 12 carrying on its outer surface an outer member or shell 14. The outer member 14 has a crown 16 which serves as the head of the piston 10 and which forms a movable wall of the lower boundary of the combustion chamber of the engine. Inner member 12 is axially slidably mounted within and with respect ot the outer member 14 and seals 18 and 20 are provided adjacent the upper and lower ends of the inner member 12 to provide a fluid tight seal between the members in the area of their sliding connection.

The inner member 12 is connected to a connecting rod 22 by way of a piston pin 24 in the conventional manner of connecting engine pistons to a crankshaft. A ring 26 is carried on the lower inside surface of the outer member 14 and slides along an axial annular surface 28 formed at the lower end of the inner member 12. The lower surface of the crown 16 and the upper surface of the inner member 12 define the limit of downward movement of the outer member 14 relative to the inner member 12 and an upper chamber 30 is formed intermediate these surfaces. The upper surface of the ring 26 and the adjacent surface of the inner member 12 define the limit of upward movement of the outer member 14 relative to the inner member 12 and a lower chamber 32 is formed intermediate these surfaces.

As the invention has thus far been described it is apparent that the inner member 12 moves up and down within the cylinder of an internal combustion engine within fixed limits and in the manner of a conventional piston. The outer member 14 reciprocates within the cylinder within the axial limits defined by the crown 16 and the ring 26. As the piston reciprocates and without more the outer member 14 would move under the influence of inertia intermediate its extreme uppermost and its extreme lowermost positions.

To regulate this relative movement an incompressible fluid is supplied to the chambers 30 and 32. The source of this fluid is preferably the ordinary lubrication system of the engine and is supplied to the piston by way of an axial passage 34 provided in the connecting rod 22 and registering with an annular passage 36 encompassing the piston pin 24. The annular passage 36 communicates the passage 34 with an outlet passage 38.

A slipper collector assembly generally indicated at 40 preferably comprises an internally cored cap member 42 carried in a recess 44 formed in the inner member 12 and having a lower edge formed to conform to the upper surface of the connecting rod 22 so that as the connecting rod 22 pivots on the pin 24 and with respect to the inner member 12 the lower surface of the cap member 42 will conform tightly to the upper surface of the connecting rod 22. A spring chamber 46 extends upwardly from the recess 44 and carries a spring 48 which urges the cap member 42 into engagement with the upper surface of the connecting rod 22. The cap member 42 is provided with a central opening 50 which provides the means for directing the oil collected from the outlet passage 38 by the cap member 42 to the spring chamber 46.

A lateral passage 52 formed in the inner member 12 connects the spring chamber 46 with a substantially vertical passage 54. The passage 54 registers at its upper end with the upper chamber 30 through a one-way inlet check valve assembly 56 and at its lower end with the lower chamber 32 through a one-way inlet check valve assembly 58. Oil is discharged from the upper chamber 30 to crankcase atmosphere by way of a pressure regulating discharge valve assembly 60 which will be described in greater detail below and which opens when oil pressure in chamber 30 exceeds a predetermined value.

The oil is fed by way of passage 54 and the one-way inlet check valve 58 to the lower chamber 32 and is permitted to escape from the chamber 32 at a predetermined rate by way of a restricted orifice 62 formed in the ring member 26. A seal 64 carried by the ring 26 prevents oil leakage between the inside surface of the ring 26 and the surface 28 of the inner member 12.

As can best be seen in FIG. 3 the pressure regulating discharge valve assembly 60 preferably comprises a casing 66 carried in a threaded bore 68 formed in the inner member 12. The casing 66 is provided with an outwardly extending head portion 70 which as can best be seen in FIG. 2 is provided on its upper surface with radial slots 71 to aid in tightening the casing 66 into the threaded bore 68. A counter bore 72 accommodates the head 70 and a seal 74 is carried in a groove 76 formed in the inner member 12 adjacent the underside of the head 70.

A valve guide casing 78 is received in a partially threaded internal bore 80 formed in the casing 66 and a seal 79 is carried intermediate the casing 66 and 78. The inner end of the guide member 78 is hollow and is open to and spaced upwardly from the lower end of the bore 80 formed in the casing 66. A tubular stop member 82 is carried within the guide casing 78 and a spring 84 encompassing the stop member 82 urges a hollow spherical ball valve 86 away from the lower end of the stop member 82 and against a valve seat 90 formed about a passage 91 disposed in the lower end of the casing 66 coaxial with the bore 68. The passage 91 registers with a passage 92 formed in the inner member 12 which in turn intersects a passage 94. As can best be seen in FIG. 2 the inner member 12 is provided with a vertical passage 96 which connects the upper chamber 30 to the passage 94 and thus with the lower surface of the valve member 86. The casing 66 is provided with a plurality of substantially radially extending openings 98 connecting the interior of the casing 66 with an annular recess 100 encompassing the lower end of the bore 68. Passages 102 and 104 formed in the inner member 12 connect the annular recess 100 to crankcase atmosphere and with a cooling chamber 106 respectively as can best be seen in FIG. 1. The cooling chamber 106 surrounds the inner member 12 in the ring groove area of the outer member 14 and is connected to a recess 108 which is connected to crankcase atmosphere by an angular passage 110 formed in the inner member 12.

It is apparent that the spring 84 normally urges the hollow ball valve 86 against the valve seat 90 to thereby close fluid flow from the upper chamber 30 into the interior of the casing 66. However, upon a pressure increase being produced in the chamber 30 sufficient to overcome the force exerted by the spring 84 and to urge the ball valve 86 upwardly against the stop member 82 oil will flow into the interior of the casing 66 and will be exhausted through the ports 98 and the annular recess 100 to crankcase atmosphere either through the passage 102 or by way of the cooling chamber 106 through the passage 104.

As previously pointed out the purpose of the construction of the present invention is to provide a piston assembly in which oil will be pumped to the upper chamber 30 to produce a relative expansion of the piston assembly to thereby increase the compression ratio of the engine. This is accomplished by the inertia acting on the outer member 14 at the upper end of the exhaust stroke and the early part of the downward intake stroke causing the outer member 14 to separate from the inner member 12 to the extent permitted by the release of oil from lower chamber 32 through the restricted orifice 62. As the members separate the upper chamber 30 expands and the one-way inlet valve 56 opens to permit oil to be directed to the expanding chamber 30 from the passage 54. The inlet valve 58 is closed at this time because of the pressure within chamber 32 so that oil will only be permitted to escape through the orifice 62. In this way the separation of the members is increased in small increments during each cycle of operation of the engine until a predetermined combustion chamber pressure has been achieved. When this happens the pressure increase in the combustion chamber is transmitted through the crown 16 to the oil within chamber 30 to act upon the valve member 86 and thus relieve pressure from the chamber 30 so that relative contraction can be produced between the members 12 and 14. As the oil is being relieved from the chamber 30 the inlet valve 56 is closed by the pressure differential across the valve and similarly inlet valve 58 is opened by the pressure differential across that valve to permit the chamber 32 to fill with oil as it is expanding.

Heretofore problems have occurred with the discharge valve assembly when the effects of inertia upon that valve assembly have been ignored. Inertia forces increase in proportion to the square of the engine speed so that at high engine speeds these forces become an important factor with respect to valve operation. In those assemblies where the valve member has opened downwardly from the upper chamber 30 there has been a tendency for the action of the valve opening to be delayed because at a time when the valve should be opening inertia is causing it to be moved upwardly against its valve seat. This problem is overcome in the present assembly by having the valve member open upwardly so that inertia aids in opening rather than hinders it. To minimize the effect of inertia on the valve assembly, however, the valve member has been made hollow and is preferably constructed of a material to give it a specific density substantially equal to that of the oil which surrounds it. Thus, the effect of the inertia will be no greater than that acting upon the oil and these two construction features provide a relatively economically produced yet quite efficient discharge valve assembly for variable compression ratio pistons.

Figure 4:
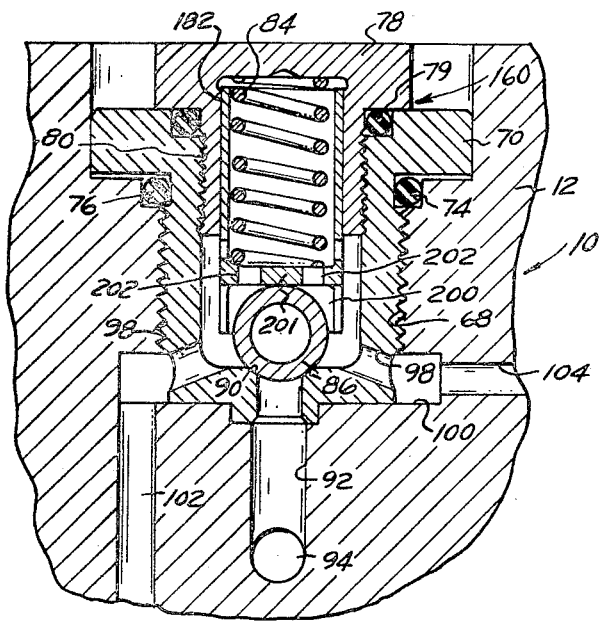
FIG. 4 is a view similar to FIG. 3 but illustrating another preferred construction for the pressure relief discharge valve shown in FIG. 3.

FIG. 4 discloses a pressure relief valve assembly 160 quite similar to the one disclosed above but in which the stop member 82 has been replaced by a member 182 which is movable relative to the valve guide 78 and which is urged by the spring member 84 against the hollow valve member 86 to thereby oppose opening movement of the valve member 86 and to urge the valve member 86 against the valve seat 90. A downward extension 200 extends partially over the valve member 86 to provide a guide and a wall portion 201 which acts as the seat for the lower end of the spring member 84 and which engages the upper surface of the valve member 86 is provided with openings 202 to equalize fluid pressure thereacross. This construction has the advantages that there is less chance for misalignment between the ball valve member 86 and the seat 90 and that the lower end of the spring member 84 does not have to be formed to engage the curved surface of the ball valve member 86.

Figure 5:
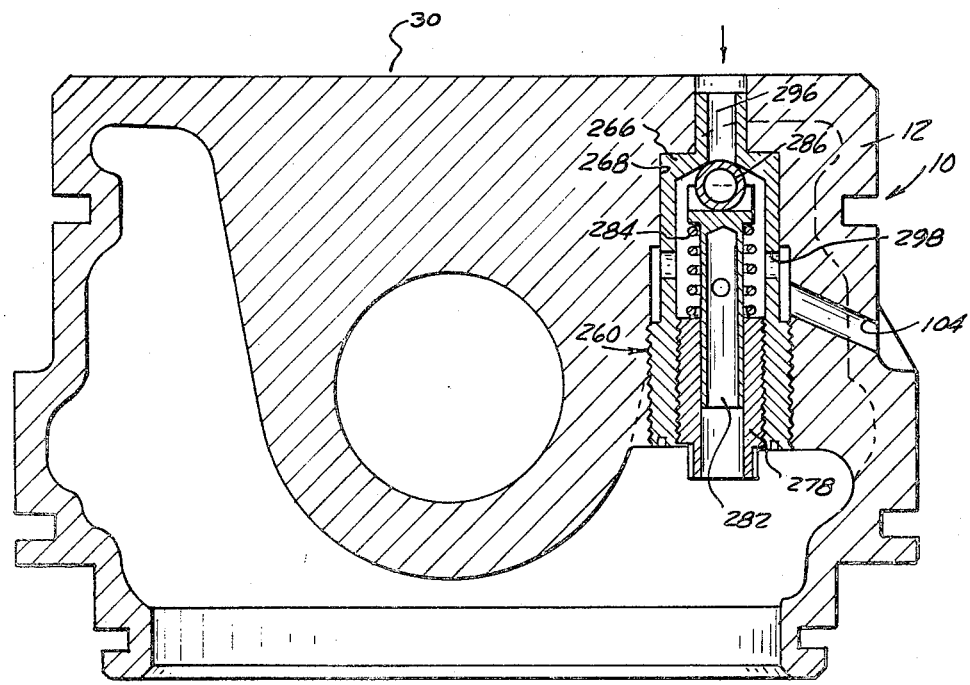
FIG. 5 is a view similar to FIGS. 3 and 4 but illustrating yet another preferred construction for the pressure relief valve shown in those figures.

FIG. 5 discloses yet another preferred pressure relief valve assembly 260 quite similar to those disclosed above but in which a hollow ball member 286 is movable downwardly to an open position against the face of a spring member 284. This is accomplished by providing a casing 266 carried within a bore 268 formed in the inner member 12 and providing the means for carrying a valve guide member 278. The spring 284 seats against the upper surface of the member 278 and urges a member 282 carrying the ball valve 286 upwardly so that the valve closes a passage 296 registering with the upper chamber 30. Ports 298 provide communication between the chamber 30 and the passage 104 when the valve 286 is open.

It is apparent that although the preferred valves have been disclosed as simply being hollow, it is apparent that these could be filled with air, could contain a vacuum, if preferred could be filled with a lighter than air gas such as helium or the like. Further, the valves could be constructed of a solid material having a specific density substantially that of the fluid being regulated and similarly in some constructions they may be of forms other than spherical.

It is also apparent that although I have described several embodiments of my invention, many other changes and modifications can be made therein without departing from the spirit of the invention as expressed by the appended claims.

I claim:
1. In an internal combustion engine, a piston having first and second members movable relative to one another in response to reciprocation of the piston with respect to a combustion chamber of the engine, and having a pressure fluid chamber within said piston which varies in internal volume in response to said relative movement and to variations in the quantity of pressure fluid therein, the combination therewith of,
 (a) means in one of said members forming a fluid flow passage communicating with said chamber,
 (b) valve means carried by said piston and movable to open and close the passage for controlling flow of fluid therethrough to vary the quantity of fluid in said chamber,
 (c) said valve means including a valve member having a specific density substantially that of the pressure fluid being regulated thereby.

2. The combination as defined in claim 1 and in which said valve member is a hollow sphere.

3. The combination as defined in claim 1 and in which said valve member is movable toward said chamber to open a fluid passage therepast.

4. In an internal combustion engine, a piston having a first and second part movable relative to one another in response to reciprocation of the piston with respect to a combustion chamber of the engine and having a pressure fluid chamber within said piston which varies in internal volume in response to said relative movement and to variations in the quantity of fluid therein, the combination therewith of,
 (a) means forming a fluid flow passage communicating with said chamber,
 (b) valve means carried by said piston and movable to open and close said passage for controlling fluid flow therethrough to thereby vary the quantity of fluid in said chamber,
 (c) means for yieldably biasing said valve means towards a closed position to thereby regulate the pressure fluid in said chamber,
 (d) said valve means being oriented for movement parallel to the direction of reciprocation of said piston and being adapted to close in a direction opposite to the inertial forces acting on said valve means as said piston decelerates in approaching the combustion chamber,
 (e) said valve means including a valve member constructed to have a specific density substantially equal to that of the fluid which it is regulating.

5. The combination as defined in claim 4 and in which said valve member comprises a hollow spherical member.

6. The combination as defined in claim 5 and which said biasing means includes a spring member bearing against said hollow spherical member.

7. The combination as defined in claim 5 and in which said biasing means includes a guide member having a portion engaging said hollow member and a spring member urging said guide member against said hollow member.

References Cited

UNITED STATES PATENTS

| | | | |
|---|---|---|---|
| 2,573,688 | 11/1951 | Butler | 123—78 |
| 2,573,689 | 11/1951 | Butler | 123—78 |
| 2,910,826 | 11/1959 | Mansfield | 123—48 |
| 3,156,162 | 11/1964 | Wallace | 123—48 XR |
| 3,161,112 | 12/1964 | Wallace et al. | 123—48 XR |
| 3,185,137 | 5/1965 | Dreyer | 123—48 |
| 3,185,138 | 5/1965 | Druzynski | 123—48 |
| 3,303,831 | 2/1967 | Sherman | 123—78 XR |
| 3,311,096 | 3/1967 | Bachle et al. | 123—78 |

OTHER REFERENCES

Oil Engines and Gas Turbine, May 1963, p. 36.

WENDELL E. BURNS, *Primary Examiner.*